United States Patent [19]
Schirpke et al.

[11] Patent Number: 5,431,340
[45] Date of Patent: Jul. 11, 1995

[54] HEATING DEVICE FOR THE SEATING COMPARTMENT OF MOTOR VEHICLES

[75] Inventors: Bernd Schirpke, Bühl; Gerd Lentz, Bühl-Oberweier; Christoph Heier, Iffezheim, all of Germany

[73] Assignee: Robert Bosch GmbH, Stuttgart, Germany

[21] Appl. No.: 777,551

[22] PCT Filed: Jul. 26, 1990

[86] PCT No.: PCT/DE90/00571
§ 371 Date: Dec. 13, 1991
§ 102(e) Date: Nov. 3, 1993

[87] PCT Pub. No.: WO91/02659
PCT Pub. Date: Mar. 7, 1991

[30] Foreign Application Priority Data

Aug. 19, 1989 [DE] Germany ............ 39 27 391.1

[51] Int. Cl.$^6$ .................................. B60H 1/06
[52] U.S. Cl. .................. 237/123 B; 415/131; 417/420
[58] Field of Search ............... 417/420; 415/129, 131; 237/12.3 B

[56] References Cited

U.S. PATENT DOCUMENTS

| | | | |
|---|---|---|---|
| 4,013,384 | 3/1977 | Oikawa | 417/420 X |
| 4,639,190 | 1/1987 | Ohta | 415/129 |
| 4,722,661 | 2/1988 | Mizuno | 415/131 |
| 4,752,183 | 6/1988 | Sakurai | 415/131 X |
| 5,090,944 | 2/1992 | Kyo et al. | 417/420 X |

*Primary Examiner*—William E. Tapoical
*Attorney, Agent, or Firm*—Michael J. Striker

[57] ABSTRACT

A device for heating a passenger compartment of a motor vehicle has a heating circuit connectable to a hydraulic circuit of an internal combustion engine, and a delivery unit including a delivery pump having a delivery element formed as an impeller wheel rotatable in a pump chamber having a suction opening, an electric motor having an armature and driving the delivery pump, and an electric coupling through which the electric motor drives the delivery pump. The magnetic coupling has one coupling half connected with the impeller wheel and another coupling half connected to the armature of the drive motor. The delivery element of the pump has an axis of rotation and is displaceable in a longitudinal direction of the axis of rotation between two operating positions, including one operating position which is close to the suction opening and another operating position which is at a distance from the suction opening.

10 Claims, 2 Drawing Sheets

5,431,340

HEATING DEVICE FOR THE SEATING COMPARTMENT OF MOTOR VEHICLES

BACKGROUND OF THE INVENTION

The present invention relates to a heating device. More particularly the present invention relates to a heating device which has a heating circuit connected to the hydraulic circuit of an internal combustion engine, a delivery pump operated by an electric motor and formed as a flow pump driven by the electric motor via a magnet coupling. Such a device in which the delivery element is arranged so as to be fixed in proximity to the suction opening as seen in the direction of its axis of rotation—specifically for reasons of the efficiency of the pump—is already commercially available. In certain operating states of the heating device the cooling water pump can produce full delivery capacity while the delivery pump located in the heating circuit is stopped. When the heating circuit cannot be separated from the coolant circuit the medium flow produced by the coolant pump flows through the pump of the heating circuit. In so doing the heating circuit pump is then also driven by the medium flowing through it, although the electric motor is stopped. The magnetic coupling between the pump and drive motor is accordingly broken. But it is then impossible to couple the two coupling halves when starting the electric motor subsequently. To bring about a coupling between the two coupling halves, the internal combustion engine and the electric motor would first have to be switched off. But since this defect can also occur when the electric motor is running there is a so-called "overflowing" of the heating circuit pump. This is possible because the delivery quantity of the coolant circuit pump considerably exceeds that of the pump in the heating circuit.

SUMMARY OF THE INVENTION

Accordingly, it is an object of the present invention to provide a hearing device for seating compartments of motor vehicles which avoids the disadvantages of the prior art.

in keeping with these objects and with others which will become apparent hereinafter, one feature of the present invention resides, briefly stated, in a device for heating, in which a delivery element of the pump is displaceable in a longitudinal direction of its axis of rotation between two operating positions, one of which operating positions is closed to a suction opening, while the other operating position is at a distance from the suction opening of a pump chamber.

When the heating device is designed in accordance with the present invention it has the advantage that when the amount flowing through the heating circuit pump is higher while under the influence of the delivery pressure of the coolant circuit pump, the medium flowing in presses the delivery element of the heating circuit pump out of its work position in proximity to the suction opening into the other operating position, so that the flow section is considerably enlarged. The coupling of the two coupling halves is accordingly maintained also during a so-called overflowing of the heating circuit pump.

In accordance with another feature of the present invention one coupling half of a magnet coupling which connects the flow pump with the electric motor is a tubular permanent magnet arranged inside the other coupling half which is bell-shaped and constructed as a permanent magnet. Also, a pot-shaped separating element is connected with a housing enclosing the delivery unit and separates a space for the electric motor from the pump chamber inside the unit housing between two coupling halves.

Still another feature of the present invention is that the pot-base of the separating element forms a support for the armature of the electric motor and for the impeller wheel of the pump. Also, the tubular coupling half can be rotatably supported on an axle held in pot base of the separating element in a cantilevering manner and the impeller wheel on the pump can be arranged at the end face of the tubular coupling half, which end face is remote of the pot base.

It is another feature of the present invention that the axle can projects with a lengthening from the structural component formed by the tubular coupling half and the impeller wheel. A stop can be arranged at the free end of the lengthening, and a counterstop of the structural component can be assigned to the stop.

The impeller wheel can have a disc-shaped base plate and wings projecting toward the suction opening and extending from a central area of the base plate to its edge area at the surface of the base plate facing the suction opening.

Finally, the free end of the wings which are close to the suction opening can be coupled by an annular cover plate, so that ducts which widen outward are formed between the adjacent wings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
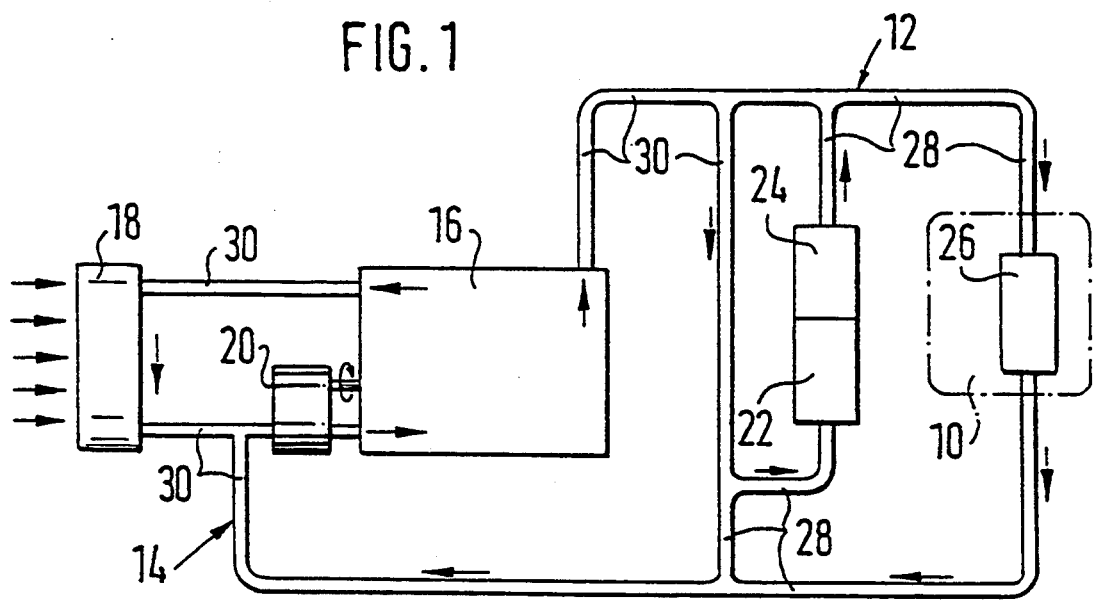
FIG. 1 is a basic view, not in correct scale, of a device for heating the passenger compartment of a motor vehicle.
Figure 2:
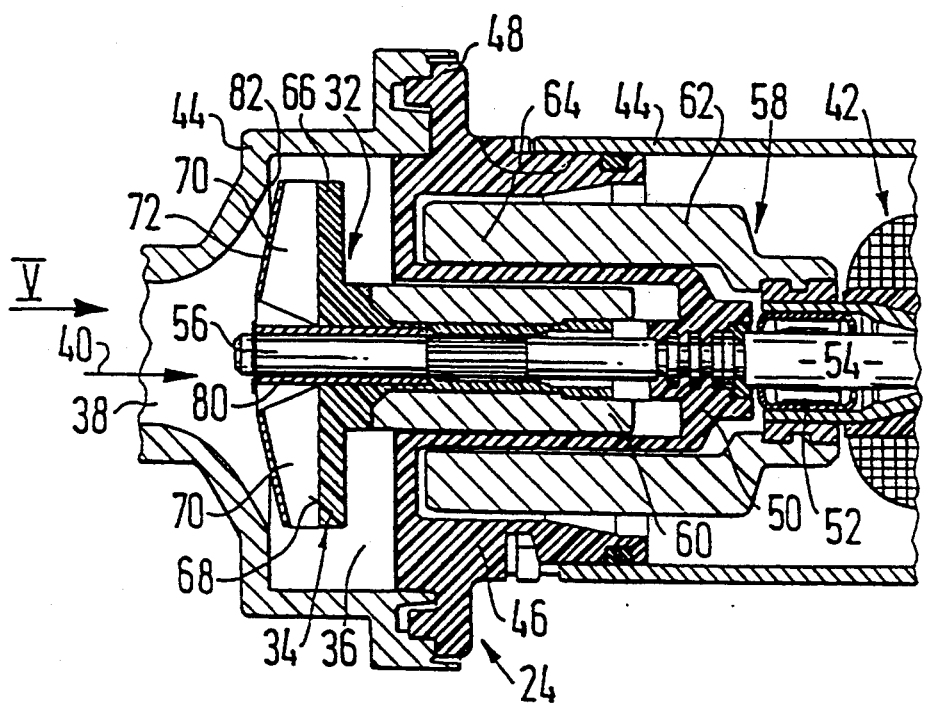
FIG. 2 shows a partial section through the pump region of a delivery unit having an electric motor and delivery pump in enlarged scale, the delivery element of the pump is found in a first operating position.
Figure 3:
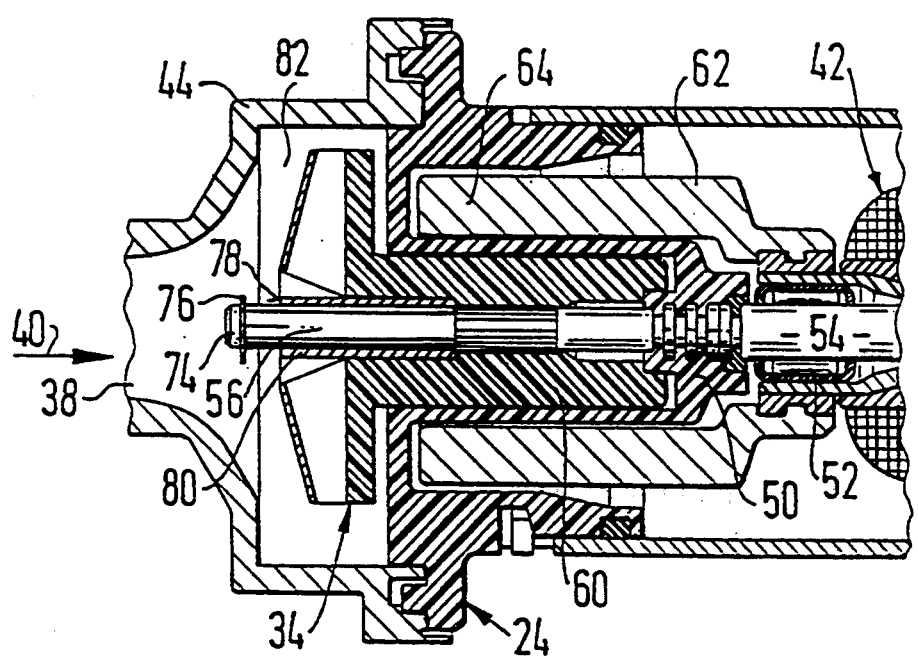
FIG. 3 shows a partial section according to FIG. 2 with the delivery element found in a second operating position.
Figure 4:
FIG. 4 shows a section through a cover ring assigned to the delivery element.
Figure 5:
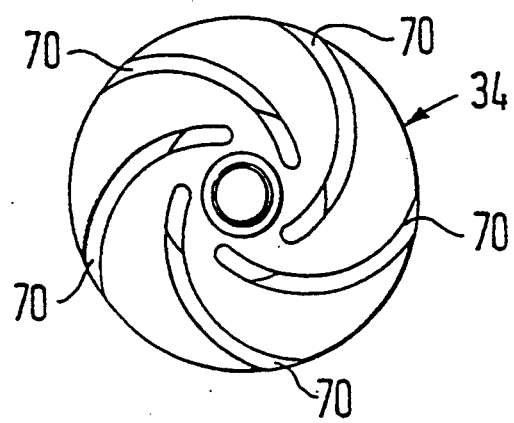
FIG. 5 shows a top view of the delivery element of the pump according to FIG. 2 in the direction of arrow V in which the cover ring is removed.

FIG. 1 shows a device which serves to heat the passenger compartment 10 of a motor vehicle which is not shown in more detail. This device has a heating circuit 12 which is connected to a coolant circuit 14 for an internal combustion engine 16 of the motor vehicle. The coolant circuit 14 has a cooler 18 which is acted upon by air. The coolant circuit 14 has further a coolant pump 20 which is mechanically driven by the internal combustion engine 16 of the motor vehicle. The heating circuit 12 has a heating device 22 in the passenger compartment 10 which, if necessary, heats the heat transfer medium. This heat transfer medium is then circulated in the heating circuit by a delivery unit 24. This heat transfer medium flows via a heat exchanger 26 arranged in the passenger compartment 10. All of the lines designated by 28 belong to the heating circuit, while the lines designated by 30 belong to the coolant circuit of the internal combustion engine 16. The delivery unit 24 has a delivery pump 32 constructed as a flow pump, whose wing or pump impeller 34 revolves in a delivery chamber 36. The delivery chamber 36 has a centrally arranged flow-in opening 38 through which the medium to be delivered flows into the delivery chamber 36 (arrow 40). The delivery unit 24 has further an electric drive motor 42 which, like the delivery pump 32, is accommodated in a common housing 44. The housing 44 has a separating element 46 having a substantially pot-shaped cross section for a tight separation of the electric motor 42 from the pump chamber 36. The pot rim 48 is securely connected with the housing 44. The pot base 50 of the separating element 46 serves as a support for a bearing 52 of an armature shaft 54 belonging to the electric motor 42. Further, an axle 56 is anchored in the pot base 50 in a cantilevering manner and serves to support the delivery element 34 of the pump 32. The delivery unit 24 has a magnetic coupling 58 having two permanent-magnet-type coupling halves 60 and 62 to ensure a rotational connection between the electric drive motor 42 on the one side and the delivery element 34 of the heating circuit pump 32 on the other side. One coupling half 60 is constructed so as to be tubular and is rotatably supported on the axle 56. It thus penetrates into the pot portion of the separating element 46. The delivery element 34 of the delivery pump 32 is arranged at its end face remote of the pot base 50 so as to be fixed with respect to rotation relative to it. The other coupling half 62 is constructed in the shape of a bell and overlaps the pot-shaped part of the separating element 46 with the tubular area 64 of the bell shape. Further, the other coupling half 62 is connected with the armature of the motor by its side facing the drive motor 42 so as to be fixed with respect to rotation relative to it. When the pump is not in operation the two coupling halves 60 and 62 position themselves relative to one another in such a way that their magnetic poles are located opposite one another at opposite poles. Since the separating element 46 is not produced from a ferromagnetic material, a driving strength sufficient for delivering the heat transfer medium in the heating circuit 28 results in the coupling 60, 62. The wing rotor 34 is provided with a disk-like base plate 66 which is connected with the tubular coupling half 60. The disk surface 68 remote of the coupling half 60 has a plurality of wings 70 which project substantially in the direction of the axle 56 and whose free ends form a truncated cone and are covered by a correspondingly shaped conical cover ring 72 (FIG. 4). The cover ring 72 is securely connected with the wings 70. The arrangement of the wings 70 of the delivery element 34 can be seen from FIG. 5. Ducts which widen outward are accordingly formed between adjacent wings 70. FIGS. 2 and 3 further show a lengthening 74 at the free end of the axle 56 which 74 projects out of the structural component formed from the coupling half 60 and impeller wheel 34 when this structural component 60, 34 is pressed extensively into the pot of the separating element 46. An annular stop 76 which can be formed e.g. by a spring ring fitting in an annular groove of the lengthening 74 is arranged at the lengthening 74. A counterstop 78 constructed at the front side of a bearing sleeve 80 belonging to the structural component 60, 34 is assigned to the annular stop 76 of the axle 56.

During normal operation of the heating device, the structural component 60, 34 occupies a first operating position shown in FIG. 2. This structural component is pressed out of the pot of the separating element 46 as far as possible because the magnetic field of the two coupling halves 60, 62 causes an axial thrust in the direction of the inlet opening 38. This is also desirable with respect to a good efficiency of the delivery pump 32 because a narrow annular gap 82 is accordingly maintained between the housing wall 44 and the delivery element 34. However, if the heating circuit pump 32 is overflowed by the cooling circuit pump 20, the delivery element 34 is acted upon by increased delivery pressure as seen in the direction of the arrow 40. The structural component 60, 34 accordingly arrives in its second operating position shown in FIG. 3 in which the annular gap 82 between the housing wall 44 and the delivery element 34 is considerably enlarged. An overflowing of the pump constructed in this manner therefore no longer causes a breaking of the driving connection between the two coupling halves 60 and 62. In particular the cover ring 72 of the impeller wheel 34 against which the overflowing medium impacts also contributes to this when the latter strikes the central area of the impeller wheel 34 via the flow-in opening 38.

It will be understood that each of the elements described above, or two or more together, may also find a useful application in other types of constructions differing from the types described above.

While the invention has been illustrated and described as embodied in a heating device for seating compartment of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for heating a passenger compartment of a motor vehicle, comprising a heat circuit connectable to a coolant circuit of an internal combustion engine; and a delivery unit including a delivery pump having a delivery element formed as an impeller wheel rotatable in a pump chamber having a suction opening, an electric motor having an armature and driving said delivery pump, and a magnetic coupling through which said electric motor drives said delivery pump, sad magnetic coupling having one movable coupling half connected with said impeller wheel and another immovable coupling half connected to said armature of said electric motor, said delivery element of said pump having an axis of rotation and being displaceable together with said movable coupling half relative to said immovable coupling half in a longitudinal direction of said axis of rotation to a first operating position during normal operation of said coolant circuit in which said movable coupling half is moved relative to said immovable coupling half under the action of a magnetic field between said coupling halves and said delivery element is located close to said suction opening, and to a second operating position when during an overflow of said delivery pump all increased delivery pressure acts on said delivery element and a distance between said delivery element and said suction opening is enlarged.

2. A device as defined in claim 1, wherein said one coupling half is a tubular permanent magnet, said other coupling half being a permanent magnet and formed bell-shaped so as to receive said one coupling half inside said another coupling half.

3. A device as defined in claim 2; and further comprising a housing provided for said delivery pump and said electric motor; and a separating element separating in said housing a space for said electric motor from said pump chamber.

4. A device as defined in claim 3, wherein said separating element is pot-shaped.

5. A device as defined in claim 4, wherein said pot-shaped separating element has a pot base which forms a support for said armature of said electric motor and for said impeller wheel of said pump.

6. A device as defined in claim 5; and further comprising an axle held in said pot base of said separating element in a cantilevered manner, said one coupling half being rotatably supported on said axle, and having an end face which is remote from said pot base, said impeller wheel of said pump being arranged at said end face of said one coupling half.

7. A device as defined in claim 6, wherein said one coupling half and said impeller wheel together form a structural component, said axle projecting so as to form a lengthening extending from said structural component.

8. A device as defined in claim 7, wherein said lengthening has a free end; and further comprising a stop arranged in said free end of said lengthening, said structural component being provided with a counterstop assigned to said stop.

9. A device as defined in claim 1, wherein said impeller wheel has a disc-shaped base plate having a central area, an edge area and a surface facing said suction opening, said impeller wheel also having wings which project toward said suction opening and extend from said central area of said base plate to said edge area of said base plate and arranged at said surface of said base plate facing said suction opening.

10. A device as defined in claim 9, wherein said wings have free end located close to said suction opening; and further comprising an annular cover plate which covers said free end of said wings so that ducts which widen outward are formed in adjacent wings.

* * * * *